United States Patent Office 3,434,640
Patented Mar. 25, 1969

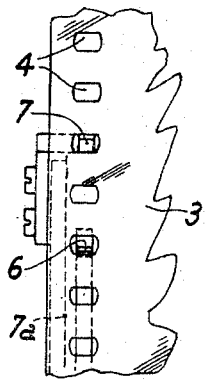
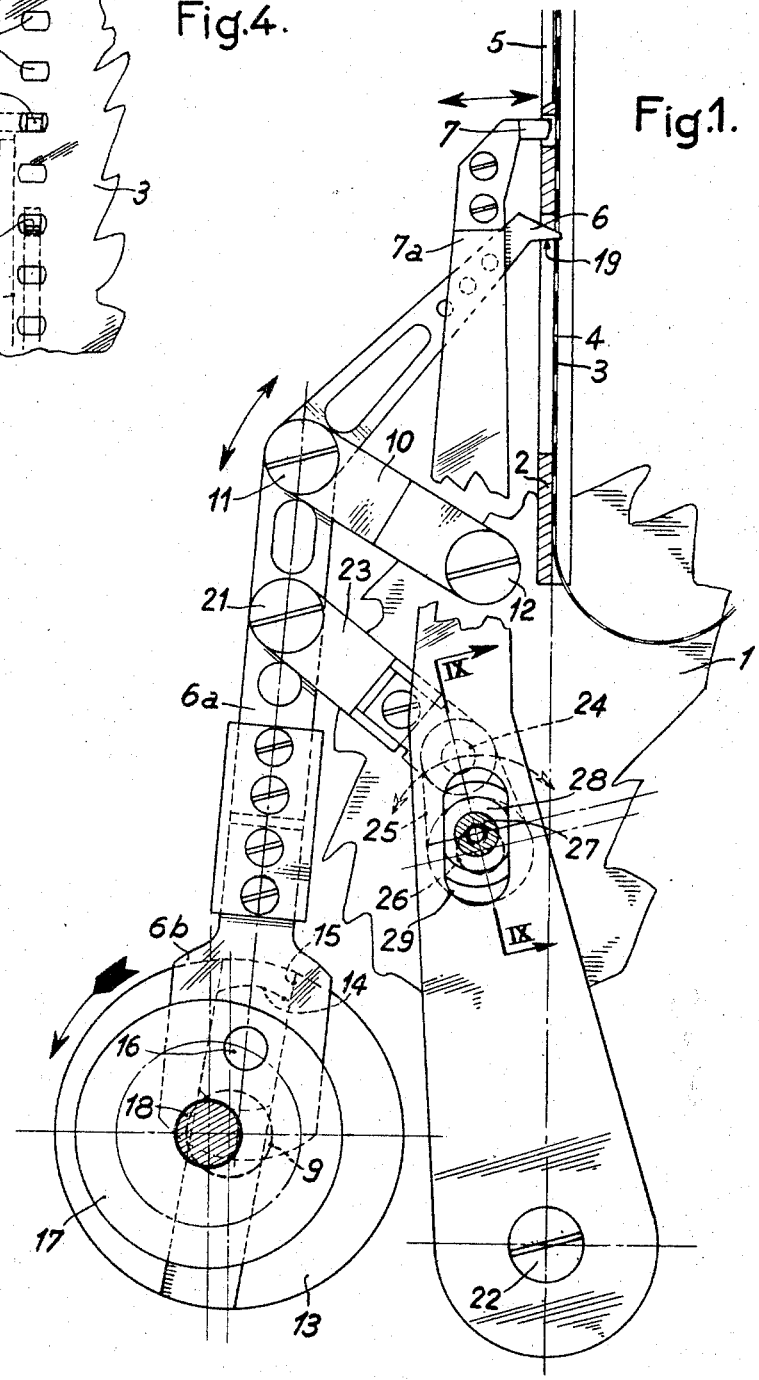

3,434,640
FILM MOVING MECHANISM OF MOTION-PICTURE APPARATUS
André Coutant and Jacques Mathot, Neuilly-sur-Seine, France, assignors to Eclair International, Societe Anonyme, Paris, France, a corporation of France
Filed Jan. 19, 1967, Ser. No. 610,295
Claims priority, application France, Jan. 21, 1966, 46,750
Int. Cl. G03b 1/28, 1/22
U.S. Cl. 226—57
6 Claims

ABSTRACT OF THE DISCLOSURE

A film moving mechanism in a motion-picture apparatus, comprising a feed claw and a pilot claw operating in synchronism, each claw being disposed at the end of a relatively long arm, said arms being adapted to pivot about axes disposed as near as possible to the plane in which the film is caused to slide, notably the axis of the pilot claw arm, characterized in that the drive is completely positive, the longitudinal movement of the feed claw resulting from the fact that the lower end of its arm is mounted on a crankpin adapted to revolve about its shaft, and the transverse movement of said feed claw is produced by the fact that said arm is connected in the vicinity of its upper portion to one end of a pivoting link having its other end pivoted about a point of the mounting plate structure which is as near as possible to the plane of movement of the film.

---

In a prior U.S. Patent No. 3,233,805, the applicants disclosed a film moving mechanism of a motion-picture apparatus, wherein a feed claw is positively driven in the longitudinal direction while being driven elastically towards the film and positively in the opposite direction in a transverse plane, the pilot claw moving only transversely under positive control in either direction, the transverse movements of the pilot claw controlling those of the feed claw.

This mechanism now in current use is intended for driving the film noiselessly; to this end the mechanism, already noiseless per se, is so designed that it cannot produce any noise when the feed claw engages in an elastic and tangential manner the lower edge of the film perforation.

This device is fully satisfactory for the step-by-step feed of light and substandard films, that is, films requiring a reduced frame-pitch stroke, but as it comprises an elastic, cam-driven system for controlling the penetration of the claw end into the film perforations, this device became cumbersome in the claw penetration zone when used for moving large-framed and therefore long-pitched films.

It is the essential object of the present invention to provide a film moving mechanism as noiseless in operation as the device broadly set forth hereinabove but with the additional advantage of having smaller over-all dimensions, especially in the film driving zone.

To this end, the step-by-step film moving mechanism according to this invention, which comprises a feed claw and a pilot claw operating in synchronism and disposed each at one end of relatively long arms pivoted about pivot pins disposed as close as possible to the plane in which the film is moved, notably in the case of the pilot claw arm, is characterized in that the drive is completely positive, the longitudinal movement of the feed claw being obtained by mounting the lower end of its arm on an eccentric pin, the transverse movement of this feed claw resulting from the fact that this arm is pivotally connected in the vicinity of its upper end to one end of a pivoted link having its other end pivoted about a point of the structure of the apparatus which is nearer to the plane of motion of the film, and that the transverse movements of said pilot claw mounted to the end of a pivoted arm are controlled by another link pivoted at one end to the arm of said feed claw and at its other end to the arm of said pilot claw.

Between the claw arm effecting a frame pitch and therefore great amplitude movement and the pilot claw arm effecting only a transverse movement of very small amplitude is a reduction lever provided with a crankpin of which the slightly eccentric pin oscillates in a hole formed in the mounting plate of the mechanism, so as to bear in this hole. The crankpin slightly eccentric in relation to its pivot axis controls the pilot claw movements directly by means of a slot or elongated hole formed in the arm of the pilot claw.

This pivoted reduction lever is oscillated in turn by a link connected to the other end of the claw arm.

With this arrangement the desired reduction and precision of the transverse movement of the pilot claw can be obtained.

The crankpin on which the lower end of the feed claw are is pivotally mounted is controlled in turn by another crankpin of same dimension, supported by a grooved plate keyed or otherwise secured to the end of the drive shaft. Under these conditions, a single bearing common to both crankpins provides the coupling for transmitting the motion. The drive plate controlling said movement is so disposed that the crankpin of this driving system is slidably mounted in a straight groove extending at right angles to the axis of rotation, the longitudinal axis of said groove intersecting the drive shaft axis. With this arrangement it is possible to set eccentrically the drive shaft axis and the sliding crankpin plate thereof with respect to the axis of the fixed crankpin plate giving the frame pitch of the feed claw, in order to impart to said feed claw, during each revolution thereof, an asymmetric movement of rotation which is accelerated through less than 180° of the cycle and retarded through more than 180° of the same cycle.

Under these conditions, it is a simple matter to cause the complete mechanism to benefit of the asymmetric motion of the claw-supporting plate since it is the feed claw that controls the pilot claw through the medium of the link associated with a reduction lever. Thus, a fully positive motion is available and it is only necessary to modify accordingly the angular setting of the eccentric formed between the drive shaft axis and the axis of the claw-supporting plate for differentiating the upward and downward speeds of the feed claw from each other, notably if this differentiation may be such, for example, that the velocity of translation of the feed claw be greater during the downward or film-feed movement, and lower during the upward movement, when the film is held against motion by the pilot claw, so as to leave more time for the exposure of the unexposed film or for the projection of a printed film, than for retracting the film at the frame pitch after each complete film-traction and film-stop cycle. Conversely, in certain exceptional cases, it is also possible to reverse by 180° about the axis of rotation the crankpin throw causing the asymmetric position of the claw-supporting plate while reducing on the other hand and therefore the speed of the film-retracting movement, thus reducing accordingly the frame exposure or projection time and further attenuating, if possible, the very faint residual noise caused by the intermittent film motion.

It might be argued that it is not definitely necessary to connect the noiseless film traction and stop mechanism to an asymmetric drive adapted to produce an angular acceleration of the system as a traction is exerted on the film during a change of frame. Now this acceleration is rendered necessary to compensate the time lost from the point of view of light passage through the film, that is, the degrees lost between the top dead centre of the feed claw stroke and the point of tangential impact of the claw on the film perforation at the location most adequate for producing noiseless operation along the curved path followed by the feed claw with respect to the film.

The attached drawings illustrate diagrammatically by way of example a typical form of embodiment of the film moving mechanism constituting the subject matter of the present invention. In the drawings:

FIGURE 1 is a side elevational view of the complete mechanism, with parts broken away;

FIGURE 4 is a front fragmentary view of the feed claw and pilot claw in the same respective positions as in FIGURE 2;

Figure 2:
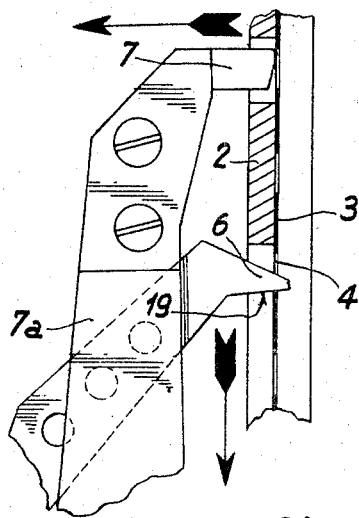
FIGURES 2 and 3 are similar fragmentary views showing the feed claw and pilot claw respectively at the beginning and at the end of the film feed movement.

Referring first to FIGURE 1, the mounting plate 1 of the motion-picture apparatus is adapted to support the complete mechanism and also the film gate 2 in which the film 3 is adapted to slide, this film 3 having conventional perforations 4 engageable, beneath the exposure window 5 of gate 2, by the feed claw 6 and pilot claw 7. The feed claw 6 is formed at one end of a pivoted arm 6a pivotally mounted at its lower end 6b on a crankpin 16 of which the throw or radial offset corresponds to one-half of the film frame pitch. This crankpin 16 is mounted in a rotary plate 17 of which the shaft 18 is mounted for loose rotation in a fixed bearing (not shown).

The rotation of plate 17 and of its crankpin 16 controlling the movement of the claw arm 6b is obtained by means to be described presently.

The claw arm 6b has its complementary portion 6a connected at 11 to a link 10 secured at its opposite end to the mounting plate 1 by means of a screw pivot pin 12.

Figure 5:
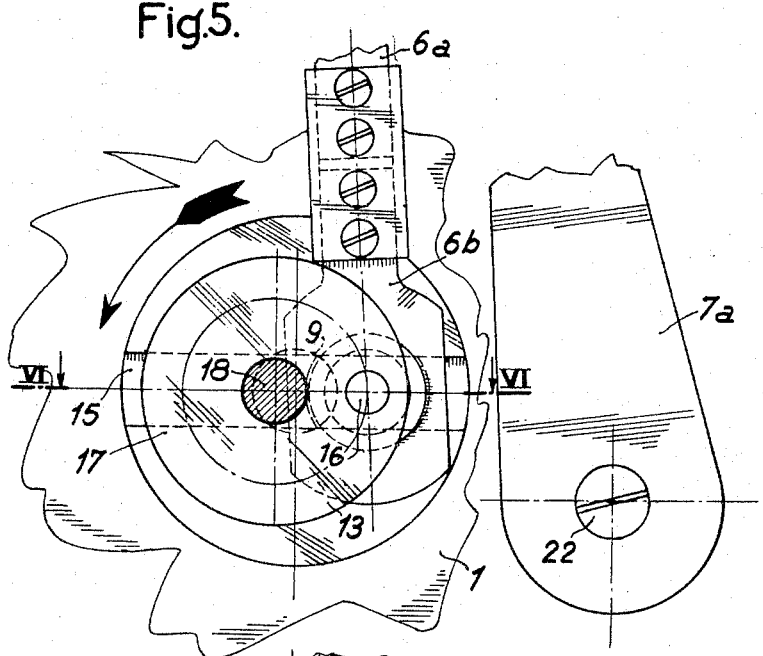
FIGURE 5 is a side elevational view showing the mounting of the lower portion of the feed claw carrier arm.
Figure 8:
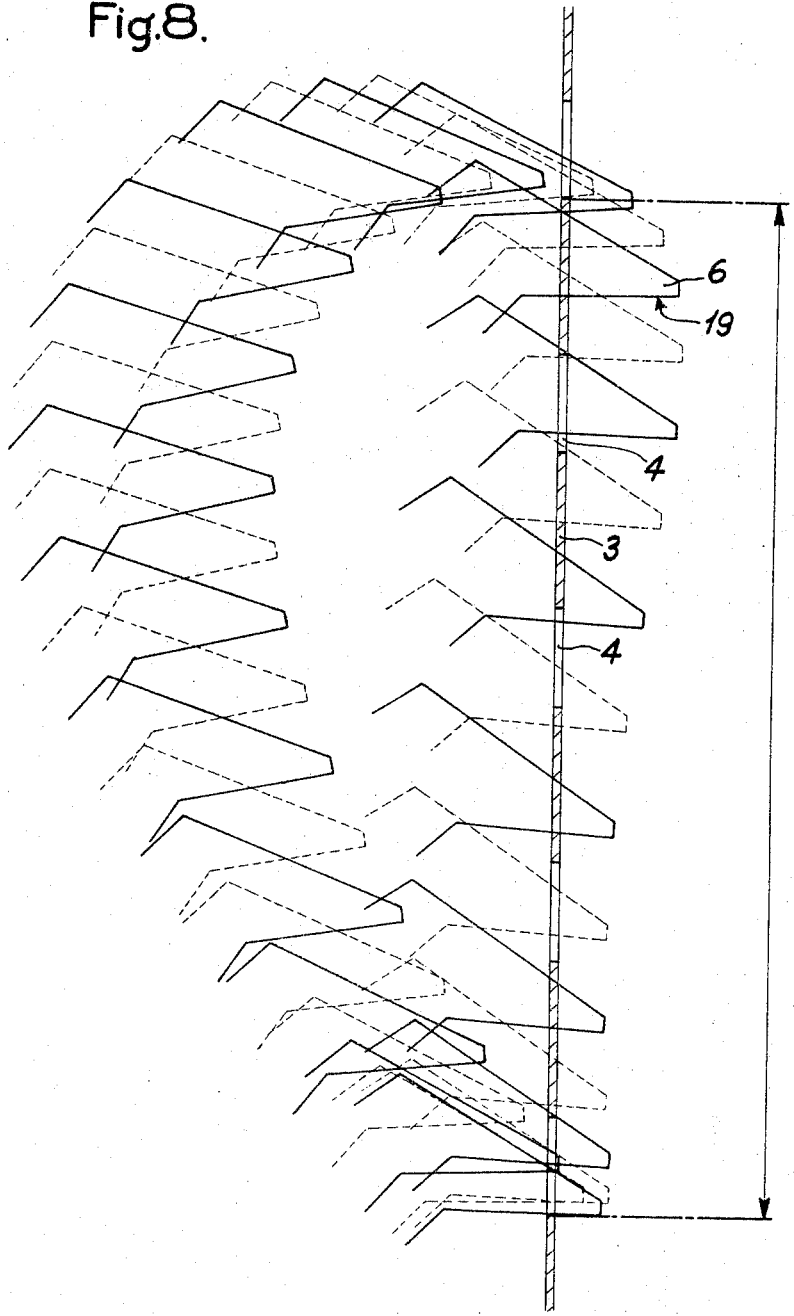
FIGURE 8 shows the various claw positions obtaining every ten degrees during the rotation of the drive shaft.

Under these conditions, the rotation of crankpin 16 about the axis of shaft 18 in the direction of the arrow, FIGURES 1 and 5, causes the vertical reciprocation of claw 6 as shown in FIGURE 8, due to the presence of the link 10 of FIGURE 1, which causes the claw 6 to follow the path required for a tangential and noiseless penetration of this claw into the lower portion of a perforation 4 of film 3.

Figure 9:
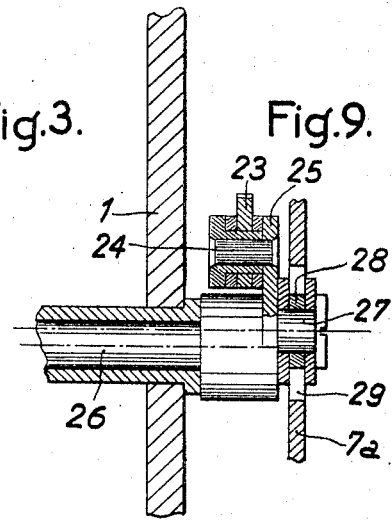
FIGURE 9 is another section taken upon the line IX—IX of FIGURE 1.

In FIGURE 8, the successive positions of this claw 6 as obtained every ten degrees are shown, especially during the engagement and disengagement of the perforation by this claw, and more particularly the point of impact of the lower edge 19 of claw 6 against the lower edge of the film perforation 4 is illustrated in order to afford a clearer understanding of the arrangement. In this figure, the frame pitch lies between the two arrows and covers about 150 degrees of the cycle, since an asymmetric control of the movement is used herein, as will be explained presently. Of course, this complication could be avoided by providing a claw stroke greater than the frame pitch, but the claw 6 would not engage the film perforation in a tangential direction and a considerable and objectionable noise would develop inevitably, as in all the conventional systems. During its movement the claw arm 6a, by bearing on the link 10, controls in turn the pilot claw 7, 7a, to which it is also connected through another link 23 associated with a reducing lever 25 of which the crankpin 27 provided with a suitable sliding member or head 28, is adapted to oscillate in a groove 29 formed in the pilot claw arm 7a. The sectional view of FIGURE 9 shows the details of the arrangement provided for reducing the initial movement. On the mounting plate 1 the lever 25 associated with link 23 carries a crankpin 27 and its sliding member 28 acting directly in the groove 29 of the pilot claw arm 7a; the pivot pin 26 of lever 25 is mounted in a fixed bearing carried by the mounting plate 1.

Figure 3:
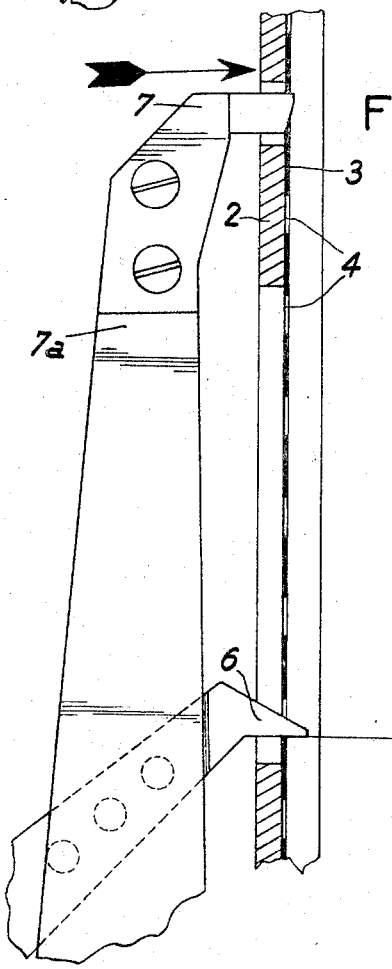

Under these conditions the movement of relatively great amplitude imparted by the link 23 is reduced in the proportions necessary for producing the low-amplitude and high-precision movement of the pilot claw 7, 7a, in perfect synchronism with the high-amplitude movement of claw 6 which, during the last portion of its film-pulling stroke, that is, at the bottom dead center, pushes the link 23 and the pilot claw arm 7a, whereby the end 7 of this arm engages a film perforation as shown in FIGURE 3, and is disengaged therefrom only when the claw 6, having attained the top dead center portion of its travel, produces the impact against the edge of the film perforation 4 (FIGURE 2), and so forth.

Figure 6:
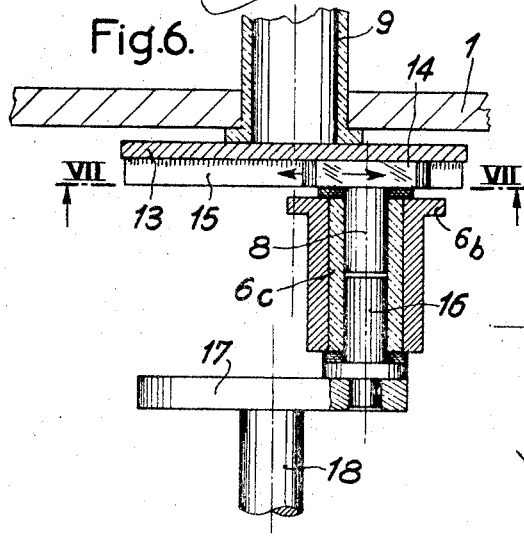
FIGURE 6 is a section taken upon the line VI—VI of FIGURE 5.

During the film-pulling fraction of this cycle it was necessary to accelerate the mechanism in order to have a longer time for stopping and exposing the film at each frame; therefore, the mechanism is controlled as follows:

In the mounting plate 1 (FIGURE 6) the shaft 9 coupled to the driving motor (not shown) is journalled for rotation and carries a plate 13 formed with a diametral groove 15 in which a crankpin 8 is slidably mounted and provided in turn with a slide-forming base portion 14. This base portion is adapted to slide in the groove 15 and the crankpin 8 proper moves bodily with the claw crankpin 16 since both crankpins 8 and 16 are rotatably mounted in a common bearing 6c.

Figure 7:
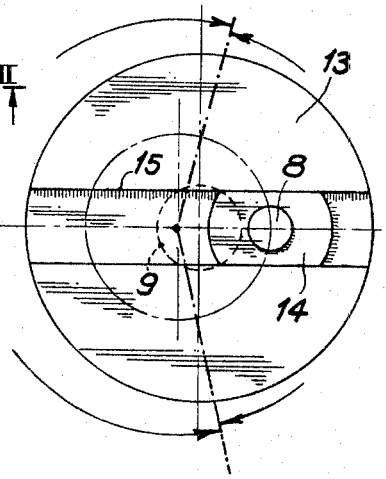
FIGURE 7 is a section taken upon the line VII—VII of FIGURE 6.

Under these conditions, during the rotation of the driving assembly 8, 9 and 13, the throw calculated as a function of a certain feed claw speed increment causes the crankpin 8 of FIGURE 7 to perform a nonstop movement in its groove 15 at a variable radius depending on the throw and on the desired asymmetry of the movement. FIGURE 5 clearly shows the axis of rotation of the motor shaft 9 and of the variable-radius crankpin 8 which, being associated through the bearing 6c with the other crankpin 16, describes therewith an offset circular path, that is, a path centered on the axis of shaft 18.

Thus, the vector connecting the axis of shaft 18 to the axis of crankpin 16 has a variable angular speed characteristic whereas the crankpin 8 constantly remaining in alignment therewith due to the provision of the common bearing 6c has a constant angular speed characteristic.

It is clear that under these conditions the complete film moving mechanism keyed on crankpin 16 is fully positive even in its asymmetry; in other words, it is solid with the movement thus generated, for example accelerated during less than 180° of the cycle and retarded during more than 180° of the same cycle, which is the scope contemplated and attained.

What we claim is:

1. In a motion-picture apparatus, a film moving mechanism comprising a feed claw and a pilot claw, two arms of relatively great length having secured to their free ends said feed claw and pilot claw, respectively, two pivot pins disposed as close as possible to the plane in which the film is to be moved by said feed claw, said arms being pivotally mounted on said pivot pins respectively, the pivot pin of said feed claw arm consisting of a crankpin rotatably driven about an axis and thus adapted to control the longitudinal movements of said feed claw, and a pivoting link having one end connected to the upper portion of said feed claw arm and its other end pivoted to a point of the mounting structure of the apparatus which is as close as possible to said plane and adapted to control the transverse movements of said feed claw arm.

2. A mechanism as set forth in claim 1, wherein a connecting link has one end pivoted to said feed claw arm and its other end pivoted to said pilot claw arm to control the transverse movements of said pilot claw.

3. A mechanism as set forth in claim 2, wherein means for reducing the amplitude of the transmitted movement are interposed between said connecting link and said pilot claw arm.

4. A mechanism as set forth in claim 3, wherein said movement amplitude reducing means consist of an oscillating reduction lever pivoted on a fixed pivot, a first crankpin on said lever controlled by said connecting link, and a second crankpin on said lever, said second crankpin being slightly eccentric and controlling directly the pilot claw, the arm of which comprises a groove engaged by said second crankpin.

5. A mechanism as set forth in claim 1, comprising a drive shaft, a plate rotatably driven from said drive shaft and formed with a diametral groove, a crankpin rotatably driven by said plate and adapted to slide in said diametral groove, said drive shaft being parallel to the axis of rotation of the crankpin constituting the pivot pin of the feed claw arm, and means for constantly keeping said crankpins in mutual alignment.

6. A mechanism as set forth in claim 5, wherein the axes of rotation of said driving crankpin and said driven crankpin are slightly offset in a plane substantially perpendicular to the plane in which the film is adapted to be moved by said feed claw.

References Cited

UNITED STATES PATENTS

| 1,798,072 | 3/1931 | Debrie | 226—57 |
| 2,124,322 | 7/1938 | Tondreau | 226—57 |
| 3,233,805 | 2/1966 | Coutant | 226—57 |

ALLEN N. KNOWLES, *Primary Examiner.*

U.S. Cl. X.R.

226—62